(12) United States Patent
Garg et al.

(10) Patent No.: US 9,830,392 B1
(45) Date of Patent: Nov. 28, 2017

(54) QUERY-DEPENDENT AND CONTENT-CLASS BASED RANKING

(71) Applicant: BloomReach Inc., Mountain View, CA (US)

(72) Inventors: Ashutosh Garg, Sunnyvale, CA (US); Romil Shah, Bangalore (IN); Vinodh Kumar, Bangalore (IN); Ram Gopalan, Bangalore (IN); Sumeet Khullar, Bangalore (IN)

(73) Assignee: BloomReach Inc., Mountain View, CA (US)

( * ) Notice: Subject to any disclaimer, the term of this patent is extended or adjusted under 35 U.S.C. 154(b) by 309 days.

(21) Appl. No.: 14/574,136

(22) Filed: Dec. 17, 2014

Related U.S. Application Data

(60) Provisional application No. 61/917,728, filed on Dec. 18, 2013.

(51) Int. Cl.
*G06F 17/30* (2006.01)

(52) U.S. Cl.
CPC .... *G06F 17/30867* (2013.01); *G06F 17/3053* (2013.01)

(58) Field of Classification Search
CPC ............ G06F 17/30867; G06F 17/3053; G06F 17/30864; G06F 17/30958; G06Q 30/02; G06Q 30/0601; G06Q 30/0633
USPC ....... 707/706, 709, 710, 723, 728, 748, 758, 707/770, 780, E17.108, E17.109, 771; 705/1.1, 26.1, 26.8, 26.7; 715/234, 733
See application file for complete search history.

(56) References Cited

U.S. PATENT DOCUMENTS

| | | |
|---|---|---|
| 6,594,682 B2 | 7/2003 | Peterson et al. |
| 6,735,592 B1 | 5/2004 | Neumann et al. |
| 7,089,239 B1 | 8/2006 | Baer et al. |
| 7,340,481 B1 | 3/2008 | Baer et al. |
| 7,437,769 B2 | 10/2008 | Meyerson |
| 7,502,836 B1 | 3/2009 | Menditto et al. |
| 7,890,378 B2 | 2/2011 | Clarke et al. |

(Continued)

FOREIGN PATENT DOCUMENTS

| | | |
|---|---|---|
| WO | 0139086 | 5/2001 |
| WO | 03014971 | 2/2003 |

OTHER PUBLICATIONS

Jong Woong Hyun, URI-Sniffing Based Load Balancing on Clustered Web Servers, May 3, 2007.

(Continued)

*Primary Examiner* — Greta Robinson
(74) *Attorney, Agent, or Firm* — Van Pelt, Yi & James LLP

(57) ABSTRACT

Techniques for performing query-dependent and content-class (e.g., with product class as a subset, in which content class can be based on a product class in an example implementation) based ranking are disclosed in accordance with some embodiments. In some embodiments, a process for performing query-dependent and content-class based ranking includes receiving a query for a search for content on a web site; performing a query-dependent and content-class based ranking of content available on the web site (e.g., using a processor); and returning a ranked list of content based at least in part on the query-dependent and content-class based ranking of content available on the web site in response to the query.

15 Claims, 6 Drawing Sheets

(56) References Cited

U.S. PATENT DOCUMENTS

| | | | | |
|---|---|---|---|---|
| 8,527,507 | B2* | 9/2013 | Shnitko | G06F 17/30675 707/723 |
| 2003/0093331 | A1* | 5/2003 | Childs | G06Q 10/06393 705/26.1 |
| 2006/0095343 | A1 | 5/2006 | Clarke et al. | |
| 2006/0167942 | A1* | 7/2006 | Lucas | G06F 17/30994 |
| 2008/0147483 | A1* | 6/2008 | Ji | G06Q 10/10 705/7.32 |
| 2011/0078029 | A1 | 3/2011 | Bickle | |
| 2011/0173057 | A1 | 7/2011 | Clarke et al. | |
| 2011/0252031 | A1* | 10/2011 | Blumenthal | G06F 17/30864 707/733 |
| 2014/0100981 | A1* | 4/2014 | Brien | G06Q 30/0601 705/26.1 |

OTHER PUBLICATIONS

Fornara et al., A Framework of Open Interactions Based on Web Services and Semantic Web Technologies, 2011.

Boutemedjet et al., Using Images in Context-Aware Recommender Systems, 2010.

Florian Eckerstorfer, Web Data Extraction—Overview and Comparison of Selected State-of-the-Art Tools, 2011.

Nong Chen, Premier Reference Source, Personalized Information Retrieval and Access: Concepts, Methods and Practices, Copyright 2008.

Eric Nishio, Laurea, A Hassle-Free System for Ordering Websites: twopointz3ro (Prototype), 2010.

Enis Soztutar, Mining Frequent Semantic Even Patterns, Sep. 2009.

Al et al., Web Content Mining for Market Intelligence Acquiring from B2C Websites, WISE 2006 Workshops, Lecture Notes in Computer Science, vol. 4256, 2006.

Zihao et al., Research on E-Commerce Application Based on Web Mining, Jun. 22-23, 2010.

Jakob et al., flashWeb: Graphical Modeling of Web Applications for Data Management, ER '07 Tutorials, Posters, Panels and Industrial Contributions at the 26th International Conference on Conceptual, vol. 83, 2007.

Kiryakov et al., Shared Ontology for Knowledge Management, Semantic Knowledge Management, 2009.

Soztutar et al., Semantically Enriched Event Based Model for Web Usage Mining, Web Information Systems Engineering, WISE 2010, Lecture Notes in Computer Science, vol. 6488, 2010.

* cited by examiner

US 9,830,392 B1

QUERY-DEPENDENT AND CONTENT-CLASS BASED RANKING

CROSS REFERENCE TO OTHER APPLICATIONS

This application claims priority to U.S. Provisional Patent Application No. 61/917,728, entitled QUERY-DEPENDENT AND PRODUCT-CLASS BASED RANKING filed Dec. 18, 2013, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web.

Internet-based web services can be delivered through web sites on the World Wide Web (WWW). Web pages are often formatted using HyperText Markup Language (HTML), eXtensible HTML (XHTML), or using another language that can be processed by a web browser that is typically executed on a user's client device, such as a computer, tablet, phablet, smart phone, smart watch, smart television, or other (client) device. A web site can be hosted on a web server that is typically accessible via a network, such as the Internet, through a web address, which is generally known as a Uniform Resource Indicator (URI) or a Uniform Resource Locator (URL).

Search engines can be used to facilitate searching of web services, such as to identify relevant web sites for particular content and/or services on the World Wide Web. Search engines (e.g., web-based search engines provided by various vendors, including, for example, Google, Microsoft Bing, and Yahoo) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or Uniform Resource Locators (URLs) for one or more web pages and/or web sites). The search results can include web pages, images, audio, video, database results, directory results, information, and other types of data.

Search engines typically provide paid search results (e.g., the first set of results in the main listing and/or results often presented in a separate listing on the right side of the output screen). For example, advertisers may pay for placement in such paid search results based on keywords (e.g., keywords in search queries). Search engines also typically provide organic search results, also referred to as natural search results. Organic search results are based on various algorithms employed by different search engines that attempt to provide relevant search results based on a received search query.

For improved Internet marketing, search engine optimization (SEO) has developed as a form of industry/technical consulting (often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of searches, including image searches, local searches, and industry specific, vertical search engines to improve the web site's web presence. For example, SEO often considers how search engines work and what people search for to recommend web site related changes to optimize a web site (e.g., which primarily involves editing its content and HyperText Markup Language (HTML) coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

DETAILED DESCRIPTION

Figure 1:
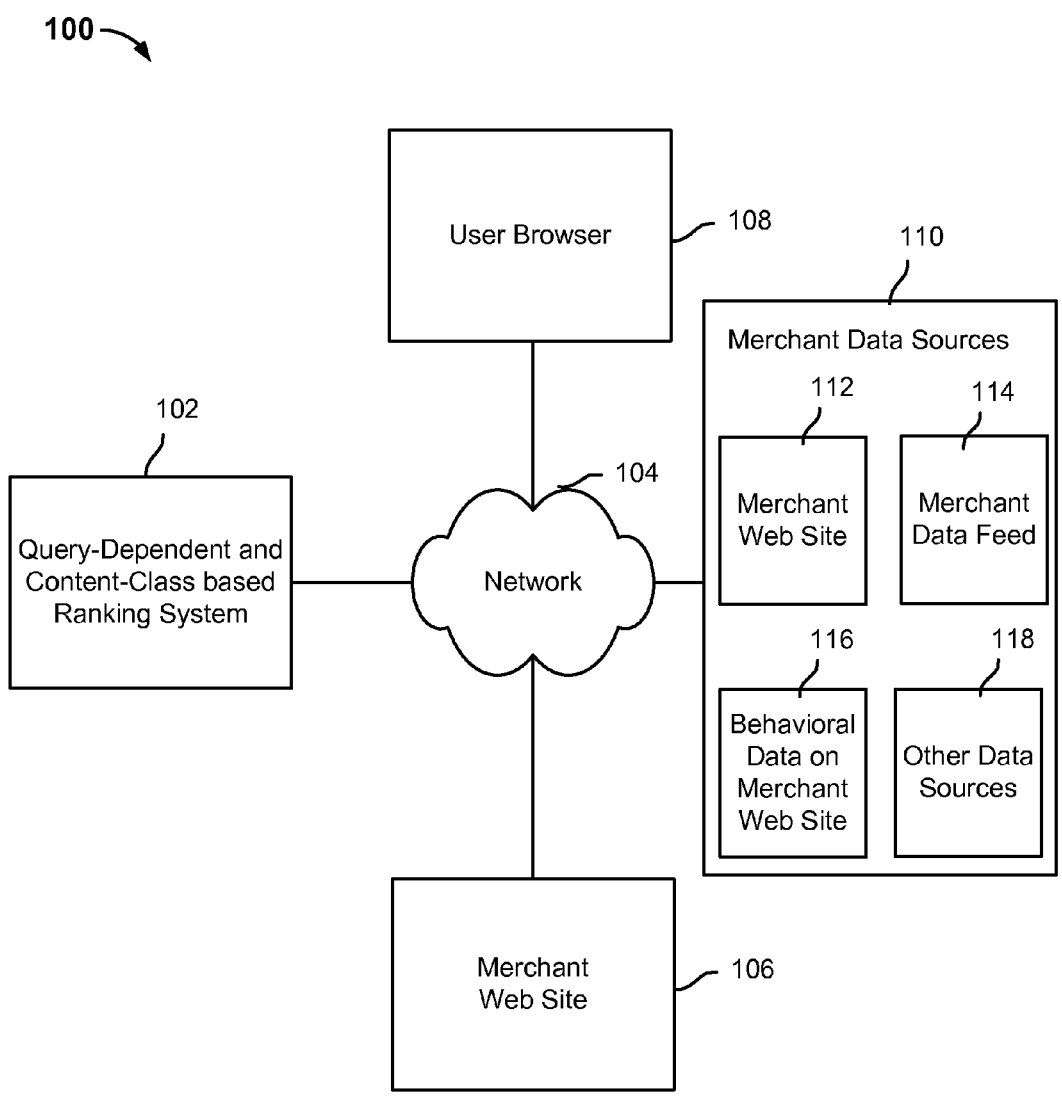
FIG. 1 is a functional block diagram illustrating an architecture of a system for performing query-dependent and content-class based ranking in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A merchant as used herein generally refers to a third party entity that uses a web site (e.g., on the World Wide Web (WWW)) to engage with customers and/or to buy and sell products and/or services. A merchant web site as used herein generally refers to a web site provided by/for the merchant that facilitates the merchant's online WWW presence to engage with customers and/or to buy and sell products and/or services (e.g., for performing e-commerce on the WWW).

Merchant web sites typically include a search box for performing an organic search of the products and/or services available (e.g., offered for sale) on the merchant's web site. For example, a merchant web site can include an organic search box that allows a user to submit search string queries to attempt to find products/services of interest to the user on the merchant's web site. The results are typically returned in a ranked list, often referred to as search results or hits that can be output as a ranked set of results (e.g., ordered listing of results) in response to a given search query processed by the merchant's web site or a third party search/web service provider for the merchant's web site.

As such, ranking of results for a given query is critical for any web site, such as merchant web sites or other web sites with a search box to allow users to query content on such web sites. For example, merchant web sites generally need to provide a search tool that can determine relevant results to user queries for content on the merchant's web site in order to effectively engage with such users (e.g., who are customers or potential customers of the merchant's web site).

However, various technical search and ranking related problems exist with current search tools that attempt to provide such ranked results in response to queries for content on a web site, such as a merchant's web site or other web sites. For example, current search and ranking approaches can combine several available signals (e.g., using various web site activity related metrics, such as number of impressions, number of views, number of purchases, and/or other metrics) to determine more relevant search results and to return such relevant search results in an appropriate order (e.g., providing more relevant results higher in the ordered results listing). But for queries that are less frequent on a web site, also referred to herein as long tail queries (LTQs), such ranking approaches can receive signals with generally weak confidence levels. This weak signal problem can also arise in the context of newly added content on the web site, because such newly added content would also typically have weak signals (e.g., a low number of impressions, number of views, and/or number of purchases).

For example, a newly launched/released product that is added for sale on a merchant's web site would typically have weak signals (e.g., metrics like number of impressions, number of views, number of purchases, and/or other potential signals would generally be weak, having relatively low numbers at least initially and for some period of time after launch/release on the web site, for such a newly added product may not have been published on the web site for a long enough period of time to allow for sufficient metrics to be associated with that newly published product offering). In some cases, it may be desirable for the web site to promote relevant fresh content for long term sustainability. For example, a merchant web site may desire to promote newly added product offerings.

Some search and ranking approaches attempt to solve these technical search and ranking related problems by allowing for manual intervention in creating result sets or by creating placeholders for products with weak signals. However, such approaches are generally not scalable (e.g., for a large number of LTQs). Furthermore, such existing approaches are often not accurate with rapidly changing product performance and user behavior.

Thus, what are needed are new techniques for providing improved search results for web services.

Accordingly, techniques for performing query-dependent and content-class (e.g., with product class as a subset, in which content class can be based on a product class in an example implementation) based ranking for web services are disclosed in accordance with some embodiments.

A merchant content data feed (e.g., a merchant product data feed) as used herein generally refers to a data object (e.g., a file or other data object) that includes a list of products/services that use groupings of attributes that define or identify each one of a merchant's products/services in a unique way. A merchant content data feed can also specify content-class based groupings of the merchant's content (e.g., categories of products/services), such as further described herein with respect to various embodiments.

A product classification of a merchant's products in the merchant's product data feed is an example of a content-class based grouping that can be specified in a merchant content data feed. For example, a product class can be used to group the merchant's products into one or more different product classes (e.g., example product classes for a retail clothing merchant can include men's clothes, men's suits, men's slacks, men's dress shirts, men's shoes, men's jackets, women's clothes, women's suits, women's dresses, women's shoes, women's jackets, etc.).

For example, a merchant web site can include an organic search box that allows a user to submit search string queries to attempt to find products/services of interest to the user on the merchant's web site. By leveraging a deep understanding of the content on a merchant's web site and content published on the merchant's web site, a query-dependent and content-class based ranking system (e.g., implemented as an organic search application) can be implemented to automatically match a given user's intent (e.g., consumer intent) to the merchant's content to identify relevant products/services on the merchant's web site, which can facilitate increased merchant revenue by improving organic search ranking of relevant products/services for a given user. In some cases, a query-dependent and content-class based ranking system can also be used to serve non-search results, such as category landing pages in e-commerce by modeling the requirement as a search problem.

In some embodiments, by using additional signals, such as query-dependent signals and product-class information, a query-dependent and content-class based ranking system offers more relevant results for LTQs and also promotes relevant fresh content (e.g., recently published content on the web site can be appropriately promoted and ranked in search results). In particular, the disclosed techniques do not rely solely on content attributes, their performance attributes (e.g., impressions, views, conversions, etc.), and their match to the user query to provide a ranked set of results, such as further described herein with respect to various embodiments.

As such, various techniques can be applied for improving the relevance of search results using query-dependent and content-class based ranking as will now be further described below.

In some embodiments, a system for performing query-dependent and content-class based ranking includes a data storage device for storing web services data associated with a web site (e.g., a merchant web site), in which the web services data comprises content on the web site (e.g., products/services and/or other content available for sale on the merchant web site); and a query-dependent and content-class based ranking system for receiving a query (e.g., a user query) for a search for content on the web site and for performing a query-dependent and content-class based ranking of content available on the web site based on the web services data. For example, the web services data associated with the merchant web site can include a merchant data feed (e.g., which can include (a subset of) information in the merchant's product catalog), web page content associated with the merchant web site, and behavioral data associated with user activity on the merchant web site. In some cases, the web services data can include such content for a plurality of different web sites (e.g., different merchant web sites).

In one embodiment, the query-dependent and content-class based ranking is determined using at least two different signals: (1) a direct query-dependent ranking signal; and (2) a content-class query-dependent ranking. The direct query-dependent ranking signal is a signal in which the ranking of the content is based on the performance of the content in response to a given query. The content-class query-dependent ranking signal is a signal in which the ranking of the content is based on the performance of the content-class that this specific content performs in response to a given query. In some cases, the query-dependent and content-class based ranking is determined using additional signals, such as further described below.

In one embodiment, the query-dependent and content-class based ranking system further includes a query-dependent engine for determining a query-dependent score (e.g., a query-dependent signal or also referred to as a direct query-dependent ranking signal) for content available on the web site based at least in part on the user query; a content-class engine for determining a content-class score (e.g., a content-class signal or also referred to as a content-class query-dependent ranking signal) for content available on the web site in response to the user query; a blending engine for determining an overall score (e.g., an overall/blended signal) for content available on the web site based at least in part on the query-dependent score and based at least in part on the content-class score; and a ranking engine for returning a ranked list of content based at least in part on the overall score for content available on the web site in response to the user query.

In an example implementation, the query-dependent and content-class based ranking system is in network communication with the web site and a user browser that is in network communication with the web site, and the query-dependent and content-class based ranking system can facilitate providing a response to the user query to provide improved search results for the user by providing a ranked list of content based at least in part on the query-dependent and content-class based ranking using various techniques further disclosed below.

In some embodiments, a process for performing query-dependent and content-class based ranking includes receiving a query (e.g., a user query) for a search for content on a web site; performing a query-dependent and content-class based ranking of content available on the web site (e.g., using a processor); and returning a ranked list of content based at least in part on the query-dependent and content-class based ranking of content available on the web site in response to the query. For example, the process can further include storing web services data associated with the web site, in which the web services data comprises content on the web site (e.g., products/services and/or other content available for sale on a merchant web site).

In some embodiments, a computer program product (e.g., embodied in a tangible, non-transitory computer readable storage medium) for performing query-dependent and content-class based ranking includes receiving a query (e.g., a user query) for a search for content on a web site; performing a query-dependent and content-class based ranking of content available on the web site; and returning a ranked list of content based at least in part on the query-dependent and content-class based ranking of content available on the web site in response to the query. For example, the computer program product for can further include storing web services data associated with the web site, in which the web services data comprises content on the web site (e.g., products/services and/or other content available for sale on a merchant web site).

For example, the historical performance of results for a query can be fed back into the blending/machine learning component(s) of the query-dependent and content-class based ranking system to provide a feedback-loop mechanism to improve future performance of the query-dependent and content-class based ranking system. This feedback-loop mechanism can provide an important signal to the query-dependent and content-class based ranking system to continuously learn the most relevant set of results for any query apart from the content and overall (e.g., query-independent) attributes of the potential results, such as further described below with respect to various embodiments.

As another example, to provide opportunities for newly-added content (e.g., content recently published on a merchant web site, such as newly added or newly released products) to appear as a result for a query, the class to which the content belongs to can be used to provide additional strength to the signal of the individual content, such as the product class to which a product belongs. This technique can be especially important for dynamic web site businesses, such as e-commerce and e-marketplaces.

These and various other techniques for performing query-dependent and content-class based ranking for web services are further described below.

FIG. 1 is a functional block diagram illustrating an architecture of a system for performing query-dependent and content-class based ranking in accordance with some embodiments. FIG. 1 provides an exemplary architecture of a system 100 for performing query-dependent and content-class based ranking that can be implemented using various computing hardware and performing various processes executed on computing hardware as will be further described below.

Referring to FIG. 1, a query-dependent and content-class based ranking system 102 is shown in communication with a network 104 (e.g., the Internet), such as the Internet.

Query-dependent and content-class based ranking system 102 is in communication with one or more merchant web sites, such as a merchant web site 106 as shown. Query-dependent and content-class based ranking system 102 is also in communication with one or more user browsers, such as a user browser 108 as shown (e.g., a web browser, such as Apple Safari®, Google Chrome®, Microsoft Internet Explorer®, or another web browser, which can be executed on a user client device, such as a laptop/desktop computer, tablet, smart phone, smart watch, or another client device capable of Internet/WWW access). Also, merchant web site 106 is in communication with user browser 108 via network 104 as also shown. Query-dependent and content-class based ranking system 102 is also in communication with various data sources (e.g., merchant web services related data sources) via network 104, such as further described below.

As also shown in FIG. 1, data sources include various merchant data sources, shown as merchant data sources 110. As shown, merchant data sources 110 can include a merchant web site 112 (e.g., a corpus of content, such as one or more web pages that are published on the merchant's web site 106), a merchant content data feed 114 (e.g., a merchant product data feed and/or other merchant content data feed, such as further described below with respect to various embodiments), behavioral data on the merchant web site 116 (e.g., user behavior on merchant web site 106 can be captured using pixel log data techniques, such as further described below), and various other data sources 118 (e.g., various other web data sources including search logs, social media data sources, electronic mail data sources, browsing history data sources, and/or other data sources can be provided).

As will now be apparent to one of ordinary skill in the art, similar web services related data for a plurality of different web sites (e.g., different merchant web sites and/or other types of web sites that have organic searches for users of their respective web sites) can be provided to facilitate using query-dependent and content-class based ranking system 102 as, for example, a cloud service for enhancing organic search results on merchant and/or other web sites by applying query-dependent and content-class based ranking techniques for web services (e.g., a subscription service for query-dependent and content-class based ranking for organic search applications for merchant web sites, which can be implemented as a cloud service), such as further described herein.

In an example implementation, query-dependent and content-class based ranking system 102 is in communication with each of the merchant data sources, such as shown in FIG. 1, to receive merchant web site data, merchant data feeds, behavior data on the merchant web sites, and/or other data sources for each of the one or more merchants. For example, merchants can subscribe to a cloud service for query-dependent and content-class based ranking to improve organic search results on their respective web sites. As another example, a merchant can implement the query-dependent and content-class based ranking system as an integrated solution with their web site (e.g., implemented locally in the merchant's own data center or with a cloud service provider that hosts their web site(s), such as using Amazon Web Services (AWS) or other cloud service data center providers).

In some embodiments, the above-described data sources (e.g., data sources 110 such as for a given merchant and/or other data sources for other merchants) can be processed using various techniques as described below. For example, a web site content fetching process can be performed (e.g., implemented using a web site content fetching engine) to fetch web pages from a merchant web site (e.g., to periodically (crawl and) fetch web pages from merchant web site 106, and also shown as data source, merchant web site 112 of merchant data sources 110). The content (e.g., HTML content, dynamic content such as Java Script content, and/or other content) from the fetched web pages from the merchant web site can then be parsed to extract attributes for a product, such as a title, a heading, a description, a price, a color(s), and/or a size(s). As another example, a merchant data feed retrieving process can be performed (e.g., implemented using a merchant data feed retrieving engine) to retrieve merchant content/product data feeds (e.g., merchant data feed 114) and parse product attributes, such as title, heading, description, and/or price. In some cases, a merchant data feed can include a content classification (e.g., a merchant product data feed can include a product classification). As yet another example, a behavior data collection process can be performed (e.g., implemented using a behavioral data collection engine) using pixel data on a merchant's web site. Using this approach, when a user visits a web page of a given merchant's web site, then dynamic content (e.g., Java Script code or other dynamic code/content) on the web page generates a pixel request to the merchant data sources (e.g., a server that is provided for capturing behavioral data on the merchant web site, such as shown as merchant data sources 110) that includes, for example, a machine IP (e.g., the IP address associated with the user's device), a user ID (optional), a referrer URL (e.g., the URL of the web page that preceded the web page in question), a web page URL, and/or other information (optional). In this example, raw pixel data can then be provided from each of the merchants (e.g., shown as behavioral data 116 for merchant web site 106). Each of the data sources is described in more detail below in accordance with various embodiments.

As similarly described above, a continuous process can be performed to fetch pages from a merchant web site (e.g., implemented using a web site content parsing engine, which can be implemented to perform fetching and parsing operations as described herein). For example, the fetching operation can receive as input a list of URLs on a merchant web site and can then fetch the content of the web page (e.g., HTML and/or other content on each of the fetched web pages). The HTML content of a fetched web page can then be parsed using parsing rules configured for merchant web pages (e.g., manually configured for a particular merchant's web pages or using a default configuration for parsing typical merchant web pages). The parser operation can parse each page to extract attributes, such as title, heading, description, and price. As such, content published on a merchant's web site can be fetched and parsed, and the merchant's web site content can then be used for performing query-dependent and content-class based ranking techniques disclosed herein.

As similarly described above, a process can be performed to retrieve merchant data feeds for each of the merchants (e.g., implemented using a merchant data feed retrieving engine as disclosed herein). In an example implementation, the merchant can either provide a location to fetch the merchant data feed or upload the merchant data feed to a location specified for retrieving (e.g., pulling) the merchant data feed (e.g., periodically or upon demand). For example, the merchant data feed can be provided as a file (e.g., in a structured data format that can be parsed, such as in an XML or other file format that provides a (subset) view of, for example, a merchant's product/service catalog, such as by providing incremental updates to product catalog information using such merchant data feeds). In this example, the merchant data feed includes a content classification (e.g., a merchant product data feed can include a product classification) that can then be used for performing content-class based ranking techniques disclosed herein. In some cases, the merchant data feed can be provided on a daily or hourly basis (e.g., or at some other periodic/time interval and/or based on demand). For example, the merchant data feed can be parsed using parsing rules configured for a given merchant or a set of merchants (e.g., based on types/groups of merchants) to extract attributes, such as title, heading, and description. In this example, the merchant data feed includes a content classification (e.g., a merchant product data feed can include a product classification) that can then be used for performing query-dependent and content-class based ranking techniques disclosed herein.

Another data source of information is behavioral user data on a web site, such as merchant web site 106. In some cases, a user may visit a merchant web page, such as a user using user browser 108 via network 104. For example, Java Script code (e.g., or other executable code/content) on the web page can make a pixel request to a server/service (e.g., to a server/service of the merchant data sources and/or a server/service of the service provider for the query-dependent and content-class based ranking system) that includes, for example, a machine IP (e.g., the IP address associated with the user's device), a user ID (optional), a referrer URL, a web page URL, and/or other information (optional). The list of web page URLs can be combined periodically (e.g., each day or at some other periodic interval) and provided as input to the above-described fetching and parsing process to extract information from web pages of a merchant's web site. In an example implementation, for each user, information can be stored to identify products visited and purchased by the user. Similarly, information can be stored to aggregate all user visits and products purchased on a merchant web site. As such, various web site activity related metrics, such as number of impressions, number of views, number of purchases, and/or other metrics, can be collected to provide behavioral data on a merchant's web site, and the behavioral data on the merchant's web site can then be stored and used for performing query-dependent and content-class based ranking techniques disclosed herein.

In one embodiment, the above-described processes for merchant data sources' collection and processing are performed per each merchant. For example, each merchant's data is processed independently using the above-described processes for processing each merchant's respective data sources to implement query-dependent and content-class based ranking techniques disclosed herein for each of the merchant's respective web sites.

Figure 4:
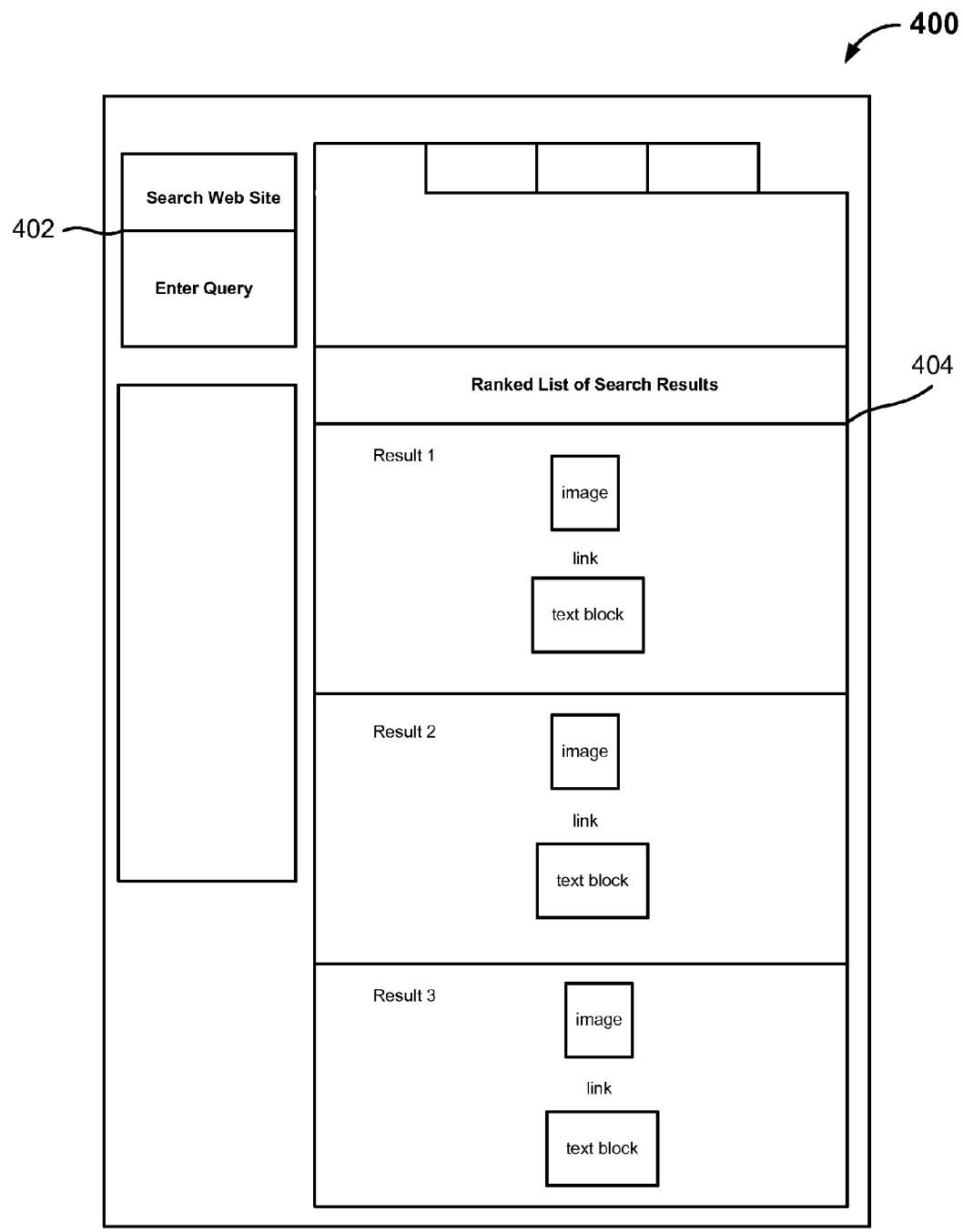
FIG. 4 illustrates an embodiment of a web page that includes widgets that are populated with content identified using the disclosed techniques.

In an example use case scenario, a search box for performing searches for content on a web site, such as merchant web site 106, can be implemented using query-dependent and content-class based ranking techniques disclosed herein, such as implemented by query-dependent and content-class based ranking system 102. For example, an e-commerce web site for ACME Company (ACME) that sells various clothing/apparel products can use the query-dependent and content-class based ranking system to provide improved search results to users of its web site (e.g., ACME can subscribe to a service that provides the query-dependent and content-class based ranking system as a service, such as a cloud service, or ACME can implement the query-dependent and content-class based ranking system with its own web site/web services data center). In an example implementation, the search box and ranked search results can be implemented as widgets on a web page(s) of the merchant web site (e.g., using one or more widgets on web pages of the ACME web site) that are populated with content identified using the disclosed techniques, such as shown in FIG. 4 and further described below. For example, the search widget can provide a user's entered search query to the query-dependent and content-class based ranking system. The query-dependent and content-class based ranking system then calculates a product score for one or more products available on a merchant's web site and sorts the products as a ranked list in response to the user's search query by applying the disclosed techniques. As an example, a top n number of products (e.g., top ten products or some other number of products, which can vary based on search results, merchant settings/configurations, and/or user preferences) offered for sale on the ACME web site can be returned as a ranked listing of such ACME products in response to the user's query, in which the selected products and ranking are based, at least in part, on calculated product scores (e.g., including a query-dependent signal/direct query-dependent ranking signal, content-class signals/content-class query-dependent ranking signal, and/or additional signals) using techniques further described below.

An example component diagram showing various components of query-dependent and content-class based ranking system 102 of FIG. 1 will now be described with respect to FIG. 2. Query-dependent and content-class based ranking techniques are also further described below with respect to FIG. 2.

Figure 2:
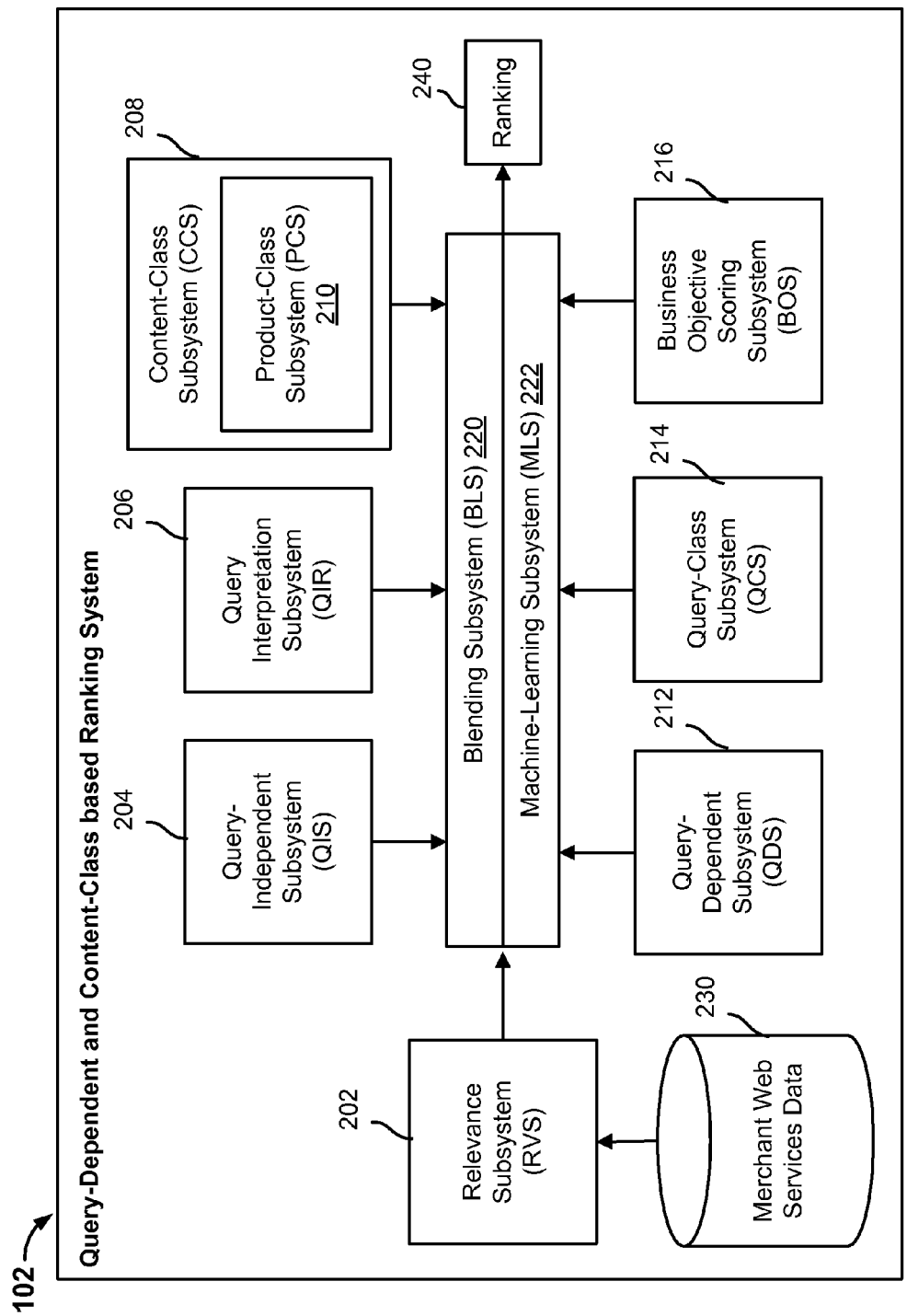
FIG. 2 is a functional block diagram illustrating components of the query-dependent and content-class based ranking system in accordance with some embodiments.

FIG. 2 is a functional block diagram illustrating components of the query-dependent and content-class based ranking system in accordance with some embodiments. In particular, various components of query-dependent and content-class based ranking system 102 are shown in FIG. 2 in accordance with some embodiments.

As shown in FIG. 2, an architecture of query-dependent and content-class based ranking system 102 can be implemented using several components to determine query-dependent and content-class based ranked results for a given query (e.g., either a user-provided query or a system-generated query) in accordance with some embodiments. As will be apparent to one of ordinary skill in the art, the various components (e.g., data stores, subsystems/engines, and other (sub)components) shown in FIG. 2 are an example implementation of query-dependent and content-class based ranking system 102, and such components can be integrated and/or further separated into distinct sub-components to similarly implement the disclosed techniques.

In one embodiment, query-dependent and content-class based ranking system 102 is configured to perform ranking (e.g., ranking of products for web services applications, such as for a web site) using a plurality of signals to facilitate determination of relevant content and ranking of such content, such as described below. For example, query-dependent and content-class based ranking system 102 can apply relevance signals, query-independent signals, query-dependent-signals/direct query-dependent ranking signals, content-class signals/content-class query-dependent ranking signal (e.g., using product-class signals as a specific case of content-class signals), and query-class signals. Each of these signals and how such signals can be determined by query-dependent and content-class based ranking system 102 is further described below with respect to their relevant components for processing such signals. As also further described below, additional signals can be provided, such as for providing a query interpretation signal and a business objective scoring signal. These signals can then be processed by a blending subsystem that can apply various machine learning algorithms to generate a ranked list of results in response to a user's search query, as further described below with respect to the blending subsystem and machine-learning subsystem.

Relevance Subsystem (RVS)

In some embodiments, query-dependent and content-class based ranking system 102 includes a relevance subsystem (RVS) 202. As shown, relevance subsystem 202 receives merchant web services related data from merchant web services data store 230. For example, merchant web services related data can include merchant web services related data for one or more merchants, such as merchant data sources 110 collected and processed as described above with respect to FIG. 1. In an example implementation, merchant web services data 230 can be stored in a data store (e.g., a data storage device) that is integrated with or part of the query-dependent and content-class based ranking system or implemented as a distinct data store (e.g., a separate data storage device for storing merchant web services data) that is in communication with the query-dependent and content-class based ranking system (e.g., implemented as a local or remote data store, such as using cloud storage, such as using Amazon Redshift™ cloud data warehouse solutions). As also shown, relevance subsystem 202 is in communication with a blending subsystem (BLS) 220 and a machine-learning subsystem (MLS) 222, which are each further described below. For example, results from relevance subsystem 202 can be communicated to blending subsystem 220 and machine-learning subsystem 222 as shown.

In one embodiment, the relevance subsystem (e.g., relevance engine) provides a base set of results (e.g., an initial set of results, that can be further refined using threshold and/or applying other subsystems to further refine the initial set of results as further described below) that match a given query (e.g., either a user-provided query or a system-generated query). The relevance subsystem uses the available attributes of the content items to match the query and provides a relevance score (e.g., also referred to herein as an RVS score or RVS/relevance signal) for each content item (e.g., each product document in a merchant's product catalog is associated with a relevance score) based on weighted matching scores.

For example, for an e-commerce site query (e.g., querying documents in the product catalog of a given merchant, such as an e-commerce web site for ACME Company that sells various clothing/apparel products), the following attributes can be used for matching each product: product title, product description, brand of the product (e.g., clothing brand), page crumb, product category tree, color of the product, size of the product, gender of the product, and/or other attributes.

In one embodiment, a threshold is applied based on the relevance (RVS) score calculated by the relevance subsystem to reduce the base set of results and then the results set is sent to further ranking subsystems, such as further described below. An example of such an implementation can limit the results with the top X percent of the total relevance score range to be passed onto other subsystems (e.g., applying an $80^{th}$ percentile threshold or some other percentile threshold). For example, if the relevance scores of possible results for a search query ranged from 0 to 200, then a threshold can be applied that would only pass through the results with the top $80^{th}$ percent scores (e.g., relevance scores greater than 40). In this example, the results with a score that is less than 40 can be discarded from further processing (e.g., will not be used in further processing and will not be returned in the ranked listing of search results output by the system). In some cases, each document (e.g., each of the documents in the merchant's product catalog) can be allocated a score by the relevance subsystem.

In one embodiment, different weights can be applied to different attributes. For example, an attribute for a product category may be given a higher weight for a first merchant's product catalog that has an extensive product categorization in their product catalog (e.g., a good distribution of products in that first merchant's product category tree) versus a lower weight for a second merchant's product catalog that has a much less extensive (e.g., less precise and/or less accurate) categorization of products in their product catalog. In an example implementation, such weights are configured by default and can change based on a (heuristic/machine learning) feedback mechanism to lower or increase weights of a given attribute based on an accuracy of results using such initial or evolving weights (e.g., refining these signals over time using heuristic techniques, such as increasing the weights for such attributes if users click-through and/or purchase ranked results and/or decreasing weights for such attributes if users do not click-through and/or do not purchase ranked results and/or if users otherwise indicate a feedback that such results are not of interest to the user in response to the user's search query on the merchant's web site).

In one embodiment, a personalized boost factor is added to specific attributes while retrieving the list of matching content items from a product catalog. In an example implementation, personalized boost factors can be implemented to customize results generated by the relevance subsystem for users based on monitored user behavior on the merchant web site. For example, if a personalization module determines (e.g., deduces) based on a monitored user's activity on a merchant's web site (e.g., by using behavioral data on a merchant's web site, which can be stored in merchant web services data 230, such as discussed above), that a given user has preferences for certain brands in certain product categories, for queries that return results in these categories, then the products from those preferred brands can be boosted in the search results for that given user by applying the personalized boost factor to increase scores for such products for that given user. Similarly, if the gender of the user can be determined (e.g., deduced) with reasonable confidence from the monitored user's activity on a merchant's web site (e.g., such as deducing/inferring the user's gender based on past purchases, such as purchases of men's shoes or purchases of women's shoes), then the subsequent searches can boost products suited for the deduced gender of the user. Other examples of personalized boost factors can similarly be implemented by applying various behavioral data monitored and collected from user activities on a given merchant's web site to further customize results generated by the relevance subsystem for given users as will now be apparent to one of ordinary skill in the art.

Query-Independent Subsystem (QIS)

In some embodiments, query-dependent and content-class based ranking system 102 includes a query-independent subsystem (QIS) 204. As shown, query-independent subsystem 204 is in communication with blending subsystem 220 and machine-learning subsystem 222, which are each further described below. For example, results from query-independent subsystem 204 can be communicated to blending subsystem 220 and machine-learning subsystem 222 as shown.

In one embodiment, the query-independent subsystem (e.g., query-independent engine) provides a performance score (e.g., also referred to herein as a QIS score or QIS/performance signal) for a content item based on historical data. The query-independent subsystem generates a performance score for each document (e.g., each document in the product catalog is associated with a performance score) independent of the query submitted by a given user.

In an example implementation, view, revenue, and/or freshness signals can be used to generate a QIS score using these techniques. For example, a freshness signal can be used to account for newly added products by using a boost value. In one embodiment, a boost value can be applied to newly added products (e.g., such a boost value can be used as a calibrating factor to adjust for newly added products in a merchant's product catalog/product offerings on the merchant web site, as a product just added by the merchant will typically not yet have any/many views and/or will not yet have relatively significant revenue). As an example, if a product is more than n number of days old (e.g., 50 days old or some other number of days old), no boost value is applied, but for products less than m days old (e.g., 20 days old or some other number of days old), a higher boost value can be applied. In some cases, the boost value can be based on historical values of related products and/or historical values of the product category. For example, assuming that an Apple iPhone® product category historically did well, then a new Apple iPhone® product release can be given a higher boost value.

In one embodiment, the query-independent subsystem computes the performance (QIS) score using several attributes (e.g., individually and combinations of), such as the following attributes: age of content item, number of impressions, number of views, number of add-to-carts (ATCs), number of conversions, revenue, and/or inventory levels. As will now be apparent, various other additional attributes (e.g., user reviews submitted, user likes, user referrals such as by a user emailing or posting the content item on a social network, etc.) can also be similarly applied to compute the QIS score.

For example, these scores can be computed for a period of n number of days going into the past (e.g., for the past 365 days or some other number of days). The value of n can be determined depending on the application and the expected lifetime/relevance of the content (e.g., products or other content). For example, for highly seasonal businesses that experience annual cycles of demand, n may be set to 365 to denote the historical window of data to be used as the past one year.

In one embodiment, older scores are given lesser weight, and more recent performance is given greater weight by applying a decaying formula (e.g., quadratic decaying formula or another decaying formula), which can be a linear or exponential decaying formula.

Thus, in an example implementation, the performance (QIS) score is calculated as follows:

$$QIS_i = f(W_j, S_{ji}); \ 1 \leq j \leq n$$

where
n=number of attributes used in computing score;
$W_j$=Weight for each attribute;
$S_{ji}$=Value for Attribute measure j for Product Pi;
f=computation function In one embodiment, QIS scores are refreshed at an interval of n number of hours depending on the business needs. For example, a deals web site can refresh QIS scores every 15 minutes given the pace of change in their inventory.

In an example implementation, QIS scores are independent of the incoming user context, such as an incoming query. For example, the QIS score of a given product will be the same irrespective of the user search query at a given point in time. QIS scores can be prominent for older content items that have existed for a reasonable amount of time.

Query-Dependent Subsystem (QDS)

In some embodiments, query-dependent and content-class based ranking system 102 includes a query-dependent subsystem (QDS) 212. As shown, query-dependent subsystem 212 is in communication with blending subsystem 220 and machine-learning subsystem 222, which are each further described below. For example, results from query-dependent subsystem 212 can be communicated to blending subsystem 220 and machine-learning subsystem 222 as shown.

In one embodiment, the query-dependent subsystem (e.g., query-dependent engine) provides a more sophisticated scoring mechanism that includes an incoming user context while computing the performance scores of a content item. User context can be based on user behavior data stored in merchant web services data store 230 (e.g., query-dependent subsystem 212 and/or various other subsystems of the ranking system can be in communication with merchant web services data store 230).

In one embodiment, the query-dependent subsystem computes a query-dependent (QDS) performance score (e.g., QDS score or QDS signal) of a content item. For example, the QDS score of a product for a given search query can be computed using the historical performance of that product for that particular search query. In some cases, a certain document in a merchant's product catalog may match a given search query well, but historical user behavior data reveals that users do not purchase such products for this specific search query. As an example, a search query for "black shoes" can match a document in ACME's product catalog for various black sneaker related products, but users that submit such search queries for "black shoes" may typically be looking for black formal/dress shoes. As a result, the historical user behavior data can reveal that users typically do not purchase black sneaker related products shown in response to such a search query for "black shoes." As such, the query-dependent subsystem can be applied to address this technical problem as described further below by accounting for such issues by computing a QDS score that can account for a user context when computing the performance scores of a content item.

Thus, in an example implementation, the query-dependent (QDS) performance score is calculated as follows:

$$QDS_i = f(W_j, S_{ji}, UC); \ 1 \leq j \leq n$$

where
n=number of attributes used in computing score;
$W_j$=Weight for each attribute;
$S_{ji}$=Value for Attribute measure j for Product Pi;
UC=User Context;
f=computation function In one embodiment, the QDS score is computed using the same attributes as QIS, though the manner of combining these attributes can be different for QDS as compared to QIS.

QDS scores will generally be prominent for older content items that have existed for a reasonable amount of time. For example, QDS scores can improve the relevance of results for users as the historical performance is considered for a given user context. In an example implementation, the QDS signal includes revenue per visit (RPV) as an input for a given user context. For example, for a broad search query, QIS scores might be similar for a large number of products, but the QDS scores can facilitate a further refinement/ selection of such products to determine which among those matching products are actually relevant for the given search query, such as discussed above.

Content-Class Subsystem (CCS)

In some embodiments, query-dependent and content-class based ranking system 102 includes a content-class subsystem (CCS) 208. As shown, content-class subsystem 208 includes a product-class subsystem (PCS) 210. As also shown, content-class subsystem 208 is in communication with blending subsystem 220 and machine-learning subsystem 222, which are each further described below. For example, results from content-class subsystem 208 can be communicated to blending subsystem 220 and machine-learning subsystem 222 as shown.

As discussed above, both query-independent subsystem 204 and query-dependent subsystem 212 generally work well in differentiating between good performers and other content items that have a reasonable amount of historical performance data. But the issue of promoting new content items can be facilitated by providing a different and new mechanism to provide a fair chance for new items to compete for user attention. In one embodiment, the content-class subsystem (e.g., content-class engine) provides such a new mechanism to solve this technical problem for facilitating a search and ranking system to appropriately identify and rank recently added content items (e.g., recently added products in a merchant's product catalog that lack significant historical performance data, such as similarly discussed above).

In one embodiment, the content-class subsystem computes a content-class (CCS) score for a given content item based on the content class that the content item belongs/is assigned to. Thus, all content items in a given content class get a content-class score irrespective of their individual performance. For example, the technique can be applied to allow new or recently added content items to also be associated with a (CCS) score (e.g., content-class score or CCS/content-class signal, also referred to herein as a content-class query-dependent ranking signal) that can facilitate a search result and ranking that allows such new or recently added content items an opportunity to more fairly compete with other established/older content items.

In an example implementation, the content-class score is computed as an average of the performance of all content items in that content class.

In one embodiment, the QDS or QIS scores of the individual content items are used as an input to the content-class subsystem for calculating the content-class performance (CCS) score.

Thus, in an example implementation, the content-class performance (CCS) score is calculated as follows:

$$CCS_i = \sum_{i=1}^{n} \frac{[QIS \text{ or } QDS]CI_i}{n}$$

where $CI_i$=Content Item;

n=number of content items in that content-class

Product-Class Subsystem (PCS)

In some embodiments, content-class subsystem 208 includes a product-class subsystem (PCS) 210 (e.g., one of the CCS instances is the PCS as shown in FIG. 2).

In one embodiment, the product-class subsystem (e.g., product-class engine) computes product-class (PCS) scores (e.g., product-class scores or PCS/product-class signals) based on the scores of products assigned to the product-class, such as similarly described above with respect to computation of CCS scores by the content-class subsystem.

In an example implementation, the product-class score is computed as an average of the performance of all products in that product-class. For example, if a newly added product in ACME's product catalog is assigned to a North Face® men's ski jackets product category, then the product-class performance (PCS) score for that newly added product is computed to be equal to an average of the performance of all products assigned to the North Face® men's ski jackets product category.

In one embodiment, product-class is based on brand and category to specify a product class (e.g., category as defined in the product catalog). For example, product classes can be defined as a combination of product category plus brand (e.g., Apple iPhone® phones, Google Nexus® phones, Nike® running shoes, and Nike® shirts are each categorized into different product classes, etc.). In some cases, the products can be assigned to a product-class based on a category tree of a product catalog for a merchant (e.g., provided via a merchant's product catalog data feed as similarly described above, in which the category tree can be more administratively configured).

In one embodiment, product classes are defined using user behavior session data as described below. For example, a user behavior data collection process can be performed (e.g., implemented using a behavioral data collection engine) using pixel data on a merchant's web site, such as similarly described above with respect to FIG. 1.

In an example implementation, the products are assigned to a product class based on co-visit performance (e.g., determined based on monitored user behavior, which can be stored in merchant web services data store 230). Co-visit performance as used herein generally refers to the number of times that two products have been viewed together within the same session (e.g., the same search session on a merchant's web site). Using this approach, products can be assigned to a product class based on co-visit performance as shown below.

For each product (Pi), define a new product class (PCi) where

PCi={Top N products that were co-visited with Pi at least K times}.

In one embodiment, N and K are configured to control the maximum size and the cohesiveness of product classes.

Thus, in an example implementation, the product class score is calculated by aggregating QDS or QIS scores of each of the items in such a product class, such as follows:

$$PCS_i = \sum_{i=1}^{N} \frac{[QIS \text{ or } QDS]}{N} P_i$$

Query-Class Subsystem (QCS)

In some embodiments, query-dependent and content-class based ranking system 102 includes a query-class subsystem (QCS) 214. As shown, query-class subsystem 214 is in communication with blending subsystem 220 and machine-learning subsystem 222, which are each further described below. For example, results from query-class subsystem 214 can be communicated to blending subsystem 220 and machine-learning subsystem 222 as shown.

In one embodiment, similar to the above-described product-class subsystem, search queries can also be clustered to improve the data availability for LTQs using the query-class subsystem (e.g., query-class engine).

In one embodiment, queries can be determined to have the same intent by clustering one or more terms of search queries based on stemming (e.g., extracting a common stem in a set of search query terms, such as a stem of "bag" that is common to the search terms "handbag" and "handbags"), based on synonyms (e.g., "handbags" and "totes" can be deemed to be synonyms), and/or based on other techniques. Various techniques can then be implemented for clustering queries based on user intent by applying stemming (e.g., if "handbag" score=0.7 and "handbags" score=0.9, then an average score of these queries can be applied such that each of these query terms can be scored to be equal to 0.8) and/or by applying synonyms (e.g., if "totes" score=0.5 and "handbags" score=0.7, then an average score of these queries can be applied such that each of these query terms can be scored to be equal to 0.6). Additional techniques can be applied for clustering queries based on intent as will now be apparent to one of ordinary skill in the art in view of the various embodiments described herein.

In one embodiment, the query-class subsystem may use a variant of the above-described co-visit methodology to compute query classes.

For each Query (Qi), define a new query class (QCi) where

QCi={Top N queries that had K products that were co-visited with products returned for Qi}.

In one embodiment, N and K are configured to control the maximum size and the cohesiveness of the query classes. For example, query classes can be used in the place of individual queries when computing the QDS score using the techniques described herein.

Query Interpretation Subsystem (QIR)

In some embodiments, query-dependent and content-class based ranking system 102 includes a query interpretation subsystem (QIR) 206. As shown, query interpretation subsystem 206 is in communication with blending subsystem 220 and machine-learning subsystem 222, which are each further described below. For example, results from query interpretation subsystem 206 can be communicated to blending subsystem 220 and machine-learning subsystem 222 as shown.

In one embodiment, the query interpretation subsystem (e.g., query interpretation engine) determines a user's intent from a given query. For example, queries can be clustered based on intent, and clustered queries can be given the aggregated or averaged score based on the scores of each of the queries in the cluster to provide a (QIR) score (e.g., a QIR score or QIR/query interpretation signal).

In particular, different queries can be processed to determine an intent of the query, such as how a user desires to engage in a given session (e.g., shopping cycle/session). For example, a general search query can indicate an informational browsing session by a user in contrast to a more targeted search query that can indicate a targeted purchase session by a user (e.g., a search query of "television" as opposed to a search query of "42-inch LED television" or a search query that specifies a particular model number of an LED television sold by a merchant). As another example, an intent of a query can be determined as a mechanism to determine whether search results should present alternate content (e.g., based on a sophistication of a user/buyer, such as a search query of "screw" as opposed to another search query of "3 inch powder coated flat top screw").

As such, based on a determined user intent of a given search query, a presentation of ranked results can be different. The search query intent can be applied for selection, ranking, presentation, and/or other aspects. For example, if a user search query is for "inexpensive black dress," then the results to be presented should be different than in response to a user search query for "new releases formal black dress." The determined intent of a given query can also be used to identify which terms of the query should match which part of a product document (e.g., color, price, etc.).

For example, the more precise or specific a search query is for a particular product, the more likely it can be determined that the search query is for a customer that is specifically looking to buy the product as opposed to a user who is merely browsing/researching products (e.g., more sophisticated/target buyer v. browsing/informational seeking buyer, which suggests different results that may be presented to such different target users, such as presenting a variety of alternate content matches for a browsing/information user).

In an example implementation, queries can be clustered and user behavior following such queries can be used to infer intent associated with such queries/clustered queries. For instance, if a user typically buys a product presented in response to a first query, then intent can be inferred to be a purchase focused user. A user that typically browses a variety of products or related products in response to a second query, then intent can be inferred to be a user that is browsing/information gathering focused.

In this example implementation, the query interpretation subsystem can interpret queries to determine a focus or intent of a given user, such as a user's intent to focus on a specific product, price, alternative content, brand, color, and/or other aspects, which can be used to determine what to return in the ranked search results as further described herein. For example, a user's search query can then be automatically rewritten based on the determined intent of the query (e.g., based on the intent determined for a query cluster that the given query is determined to belong to, using the above-described clustering technique), and the machine-generated intent query can then be submitted to the relevance subsystem (e.g., RVS 202) to generate relevant content items based on the intent query as similarly described above.

Business Objective Scoring Subsystem (BOS)

In some embodiments, query-dependent and content-class based ranking system 102 includes a business objective scoring subsystem (BOS) 216. As shown, business objective scoring subsystem 216 is in communication with blending subsystem 220 and machine-learning subsystem 222, which are each further described below. For example, results from business objective scoring subsystem 216 can be communicated to blending subsystem 220 and machine-learning subsystem 222.

In one embodiment, the business objective scoring subsystem (e.g., business objective scoring engine) can be used to boost or demote a product that can be provided as an input signal to the blending score. For example, for those products that are low margin, then such low margin products can be demoted (e.g., refurbished TVs versus new TVs).

In an example implementation, the business objective scoring subsystem can be implemented as a tunable parameter to promote or demote certain products. For example, the business objective scoring subsystem can be implemented as a configurable parameter that allows a merchant to promote or demote certain products.

Blending Subsystem (BLS)

In some embodiments, query-dependent and content-class based ranking system 102 includes a blending subsystem (BLS) 220. As shown, blending subsystem 220 is in communication with machine-learning subsystem 222, which is further described below. For example, blending subsystem 220 can determine ranked results that are communicated to ranking output component 240.

In one embodiment, the different inputs (e.g., different scores) from the various subsystems, such as shown in FIG. 2 and described above, are processed (e.g., blended together) by the blending subsystem (e.g., blending engine) to generate a composite score (e.g., an overall/blended score or overall/blended signal) that can be used to determine a ranked set of content (e.g., a ranked list of products in response to a given search query). For example, the blending subsystem can be configured to blend the different subsystem scores to meet a business objective for providing the ranked list of content items.

Thus, in an example implementation, the blended score is calculated as follows:

$$BLSi = f(W_k, S_k); 1 < k < n$$

n=number of scores from different subsystems;
Sk=Score from subsystem k;
Wk=Weight for score Sk In one embodiment, a feedback loop is used to adjust weights (e.g., fine tune weights) based on outcomes (e.g., views, conversions, etc.) over time to improve performance of query-dependent and content-class based ranking system 102 for each of the subscribers to the service (e.g., merchant web sites or other subscribers).

For example, for ranking of products for e-commerce site search (e.g., a search on a merchant's web site), the blended score can be determined using the relevance score and a boosting constant, such as shown below.

$$BLS = RVS*(1+QIS)*[(1+QDS)\char`\^QB]$$

where
RVS=Relevance Score
QB=Boosting constant (>1)

In one embodiment, business users may influence the final blending formula to meet specific business goals. For example, for e-commerce applications, the merchandizing manager can assign higher weight for inventory sell-through for a certain period of time to reduce the cost of inventory even at the expense of incurring lower margins. Thus, in some cases, the blending formula can be configured and customized per merchant.

In one embodiment, squashing factors are used by the blending formula for each score. For example, squashing constants can be used to calibrate respective inputs/scores from different subsystems so that they are respectively weighted/calibrated to not have certain subsystem inputs be given too great of weight in the blended score result. This approach can squash or cap signal values accordingly to avoid results being skewed by one or more subsystems. As an example, squashing function can set a cap on a score to decrease the value of increase of a given signal once it starts to exceed a threshold (e.g., X revenue, or Y views, etc.), such as avoiding having a revenue signal dominate or have too much influence in the calculation of an overall score by having significant revenue for a given product relative to another product. Each of the signals can be squashed based on different thresholds/functions.

In one embodiment, the various constants used in the system (e.g., used by the blending subsystem and/or other subsystems) can be adjusted using manual configurations/customizations and/or using feedback loop and/or machine generated adjustments for fine-tuning over time one or more constant values based on results over time, such as discussed below using various machine learning techniques (e.g., implemented by MLS 222).

Machine Learning Subsystem (MLS)

In some embodiments, query-dependent and content-class based ranking system 102 includes a machine-learning subsystem (MLS) 222. As shown, blending subsystem 220 is in communication with machine-learning subsystem 222. As discussed above, the machine-learning subsystem (e.g., machine-learning engine) can perform machine generated adjustments for fine-tuning over time one or more constant values based on results over time, such as further described below.

In one embodiment, the weights (Wj) across various subsystems and specifically the BLS are computed using machine learning techniques in the MLS engine. For example, the machine-learning subsystem can facilitate in optimizing weights for a given application and its objectives. The machine-learning subsystem can also maintain the weights current and optimized, by regularly recomputing and applying them as the underlying data changes (e.g., as product and/or other content data changes and/or user behavior changes).

In an example implementation, machine learning techniques that can be used include supervised techniques, such as the following: Bayesian, linear regression, logistic regression, and/or Hidden Markov models. In other cases, advanced unsupervised learning techniques can be applied, for example, artificial neural networks can be employed to derive and constantly update the weights for optimal performance of the ranking generated by the system using the disclosed techniques.

As an example use case scenario, the query-dependent and content-class based ranking system can be used to facilitate improved ranked results for a product search (e.g., onsite or offsite) for multiple e-commerce merchants. The system can be implemented onsite with a given merchant's web site server/data center and/or offsite, such as a cloud service as similarly described above with respect to FIG. 1. An objective in this example is to identify, rank, and present a user with a ranked set of products that are responsive to a given user intent as well as the given merchant's objectives (e.g., business objectives or other objectives). For example, these objectives can include maximizing revenue per search, views per search, product sell-through, and/or various other business objectives for e-commerce merchants, which can be implemented using the disclosed techniques performed by the query-dependent and content-class based ranking system as described herein.

In an example implementation, the query-dependent and content-class based ranking system is implemented as an Amazon Web Services (AWS) instance (e.g., or using another cloud service computing platform) that includes an indexing engine (e.g., implemented using, for example, Apache SolrCloud) in which each of the above-described components of the query-dependent and content-class based ranking system (e.g., scoring/signal processing components shown in FIG. 2 as described above) can be implemented using a customized SOLR component (e.g., programmed in Java or another programming language).

As will be apparent to one of ordinary skill in the art, each of these engines in FIG. 2 can be implemented, for example, as distinct or integrated software components, which can include module(s), package(s), and/or other sub-components to provide an executable computer program that can perform these described functions when executed on a processor, and can be implemented using a programming language such as Java, Python, Objective C, and/or other programming languages.

Figure 3:
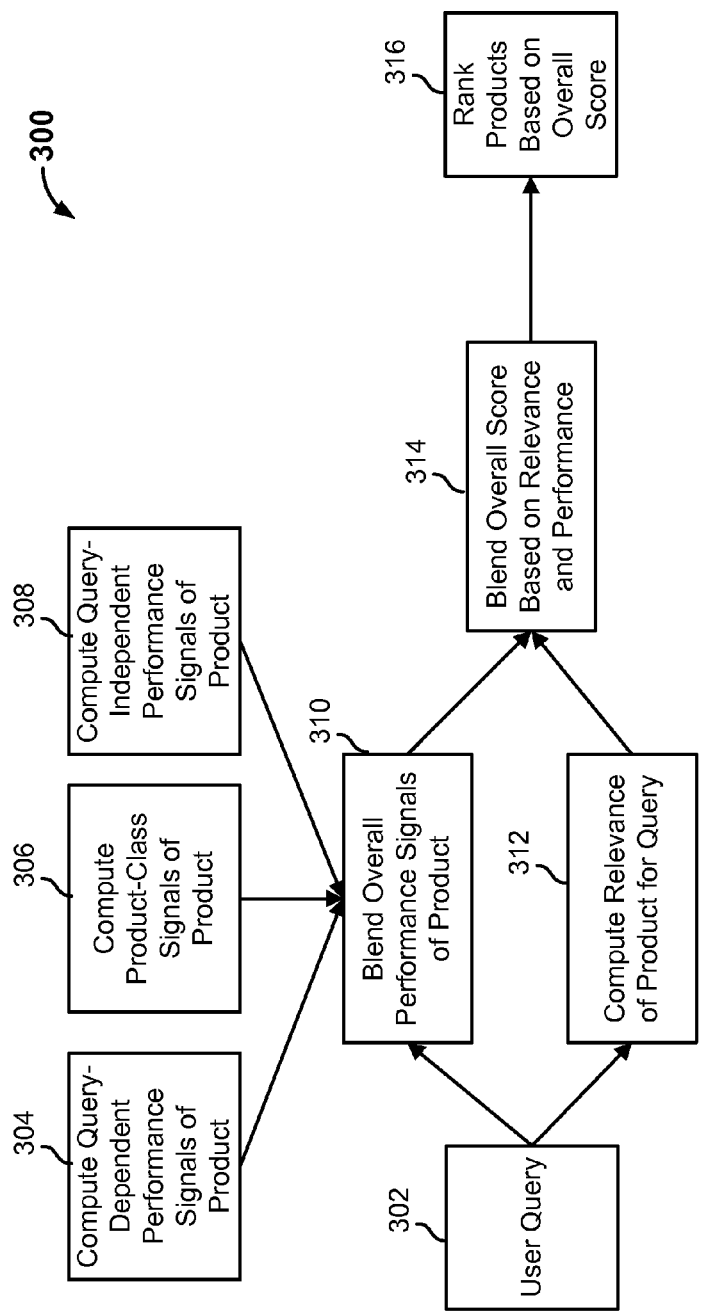
FIG. 3 is a functional block diagram illustrating an activity diagram of the system for performing query-dependent and content-class based ranking in accordance with some embodiments.

FIG. 3 is a functional block diagram illustrating an activity diagram of the system for performing query-dependent and content-class based ranking in accordance with some embodiments. As shown in FIG. 3, an example use case of query-dependent and content-class driven ranking is performed for product search on e-commerce web sites to provide a relevant and business-driven ranking of products, which can be implemented using the system and techniques described above. In one embodiment, the activity diagram 300 of FIG. 3 is performed by a query-dependent and content-class based ranking system, such as described above with respect to FIGS. 1 and 2.

Referring to FIG. 3, at 302, a user query is received (e.g., a user's query for a product search on a merchant's web site). At 304, query-dependent performance signals of each product (e.g., for each product offered by the merchant on the merchant's web site) are computed (e.g., using a query-dependent engine, such as described above). At 306, product-class signals of each product (e.g., for each product offered by the merchant on the merchant's web site) are computed (e.g., using a product-class engine, such as described above). At 308, query-independent performance signals of each product (e.g., for each product offered by the merchant on the merchant's web site) are computed (e.g., using a query-independent engine, such as described above). As also described above, various other signals can be computed, such as query interpretation signals (e.g., using a query interpretation engine, such as described above), a business objective signal (e.g., using a business objective scoring engine, such as described above), and/or other signals, which can then similarly be provided as input to the blending engine as described below.

At 310, the above-described product signals are then blended (e.g., using a blending engine, such as described above) to compute overall performance signals of each product (e.g., for each product offered by the merchant on the merchant's web site).

At 312, the received user query is also processed to compute a relevance (e.g., using a relevance engine, such as described above) of each product for the user query (e.g., for each product offered by the merchant on the merchant's web site).

At 314, an overall score is computed based on the overall performance signals and relevance signal (e.g., using the blending engine, such as described above) for each product (e.g., for each product offered by the merchant on the merchant's web site).

At 316, products are ranked based on their overall score. A ranked product listing can then be returned to the user's browser in response to the user's query, such as further described below with respect to FIG. 4.

FIG. 4 illustrates an embodiment of a web page 400 that includes widgets 402 and 404 that are populated with content identified using the disclosed techniques. In various embodiments, content (e.g., images, texts, links such as URL/URI links, and/or other static or dynamic web page content) may be published on a web page in any appropriate manner, including in-line with previously existing content and/or separately via one or more dedicated widgets. In one embodiment, widgets 402 and 404 are dynamically populated. A "Search Web Site" widget 402 is a widget that can be used by a user of the web site to perform a search for content on the web site (e.g., a product search for sale by the merchant on the merchant's web site). "Ranked List of Search Results" widget 404 is a widget that can be used to populate the web page with a ranked content listing in response to a user's entered search query. For example, the "Ranked List of Search Results" widget can be populated with images (which may comprise links), links, and text blocks of the ranked content (e.g., ranked products). For instance, the text blocks may comprise snippets generated from other pages or documents (e.g., snippets from a product document in the merchant's product catalog). In an example implementation, widgets 402 and/or 404 of web page 400 can be dynamically populated via a remote API (Application Program Interface) call or other data delivery mechanism.

The example of FIG. 4 illustrates one technique for providing the ranked content in response to a user's content query on a web site. In other embodiments, other techniques can be used to facilitate a mechanism for receiving a user's query to search for content on a web site and to output a ranked listing of content in response to the user's query. For example, an audio user interface or other user interface mechanisms can be implemented to similarly provide a mechanism for receiving a user's query to search for content on a web site and to output a ranked listing of content in response to the user's query.

Figure 5:
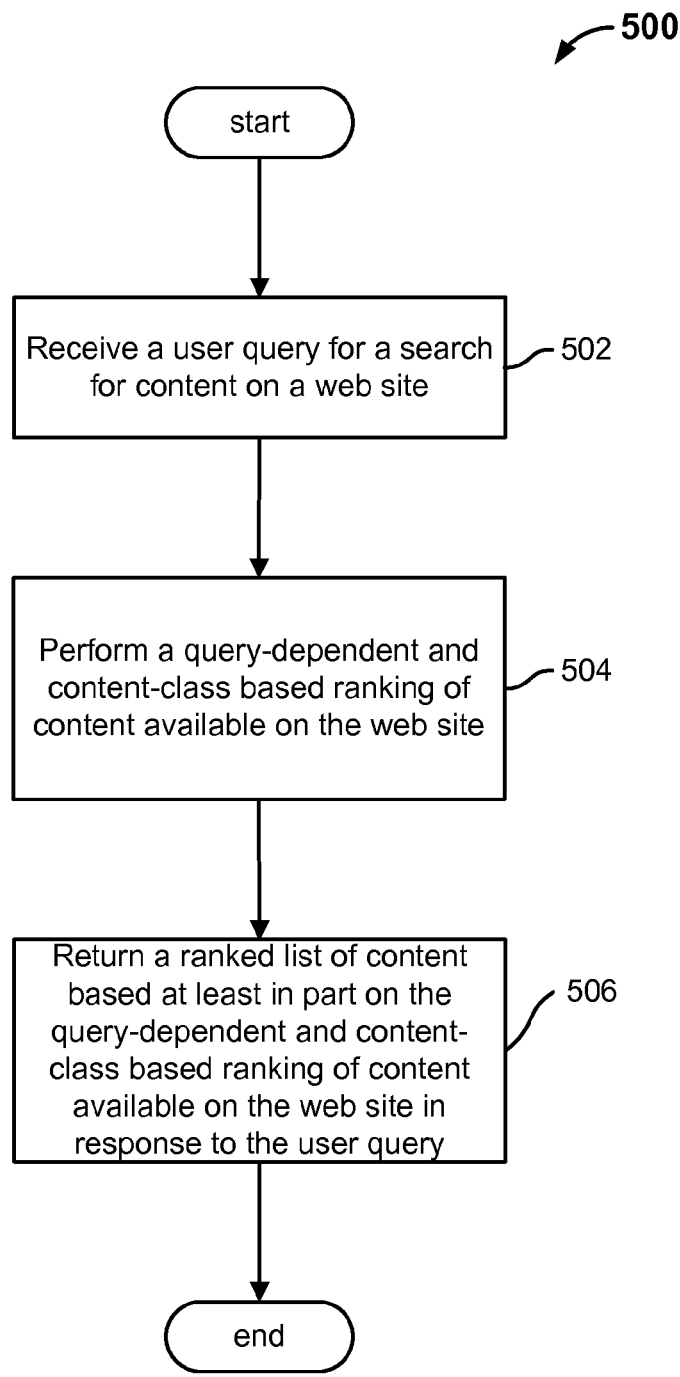
FIG. 5 is a flow diagram illustrating a process for performing query-dependent and content-class based ranking in accordance with some embodiments.

FIG. 5 is a flow diagram illustrating a process for performing query-dependent and content-class based ranking in accordance with some embodiments. In one embodiment, process 500 is performed by a query-dependent and content-class based ranking system, such as described above with respect to FIGS. 1-4.

The process begins at 502. At 502, a user's query for a search for content on a web site is received. For example, a user's query for content (e.g., products) on a web site (e.g., a merchant's web site) can be received for processing.

At 504, a query-dependent and content-class based ranking of content available on the web site is performed. For example, query-dependent and content-class based ranking techniques disclosed above can be performed (e.g., using a processor) to generate a ranked list of content available on the web site (e.g., a ranked list of products available for sale on the merchant's web site).

At 506, a ranked list of content based at least in part on the query-dependent and content-class based ranking of content available on the web site is returned in response to the user query. For example, a ranked list of products that are available for sale on a web site (e.g., the merchant's web site) can be returned for presentation on a user's browser.

Figure 6:
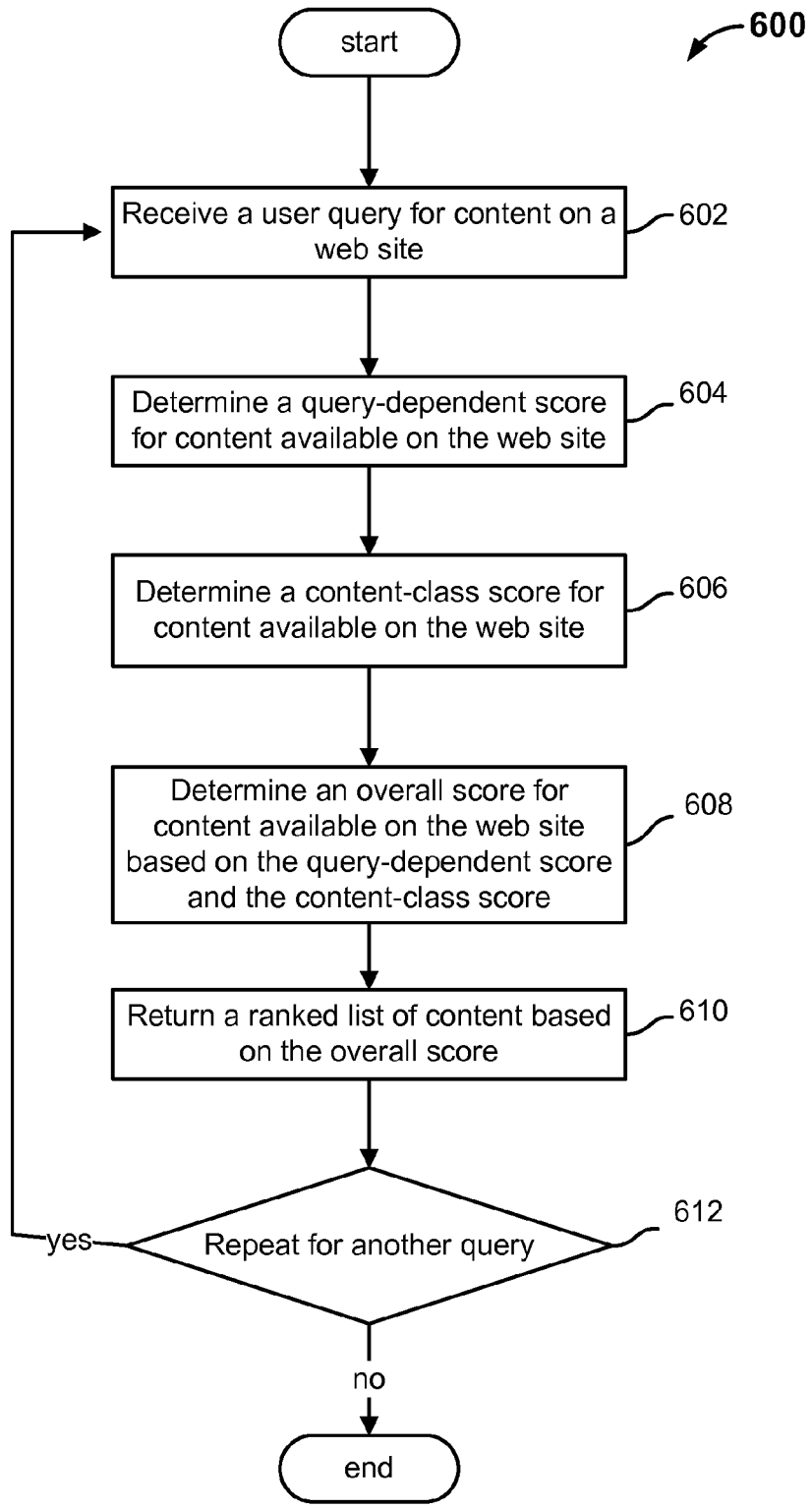
FIG. 6 is another flow diagram illustrating a process for performing query-dependent and content-class based ranking in accordance with some embodiments.

FIG. 6 is another flow diagram illustrating a process for performing query-dependent and content-class based ranking in accordance with some embodiments. In one embodiment, process 600 is performed by a query-dependent and content-class based ranking system, such as described above with respect to FIGS. 1-4.

The process begins at 602. At 602, a user's query for a search for content on a web site is received. For example, a user's query for content (e.g., products) on a web site (e.g., a merchant's web site) can be received for processing.

At 604, a query-dependent score for content available on the web site is determined (e.g., using a query-dependent engine, such as similarly described above). For example, query-dependent scoring techniques disclosed above can be performed (e.g., using a processor) to determine a query-dependent score of content items available on the web site (e.g., generating a query-dependent score/direct query-dependent ranking signal for each of the products available for sale on the merchant's web site).

At 606, a content-class score for content available on the web site is determined (e.g., using a content-class engine, such as similarly described above). For example, content-class scoring techniques disclosed above can be performed (e.g., using a processor) to determine a content-class score of classes of content items available on the web site (e.g., generating a content-class score/content-class query-dependent ranking signal for each of the categories of products available for sale on the merchant's web site).

At 608, an overall score for content available on the web site is determined based (at least in part) on the query-dependent score and the content-class score (e.g., using a blending engine and machine-learning techniques, such as similarly described above). For example, blending and machine-learning techniques disclosed above can be performed (e.g., using a processor) to determine an overall score of content items available on the web site (e.g., generating an overall score/signal for each of the products available for sale on the merchant's web site).

At 610, a ranked list of content based on the overall score is returned in response to the user query for content on the web site. For example, a list of n content items can be returned for presentation in a user browser (e.g., the highest ranking top n products based on the overall score for each of the products can be returned and presented in the user browser, such as shown in FIG. 4).

At 612, whether to repeat the process for another user query is determined. If so, then processing returns to 602. Otherwise, the process is completed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing query-dependent and content-class based ranking, comprising:
   a processor; and
   a memory coupled with the processor, wherein the memory is configured to provide the processor with instructions which when executed cause the processor to:
      store, using a data storage device, web services data associated with a web site, wherein the web services data comprises content on the web site; and
      receive, using a query-dependent and content-class based ranking system, a query for a search for content on the web site;
      perform a query-dependent and content-class based ranking of content available on the web site, comprising to:
         determine a query-dependent score for content available on the web site based at least in part on the query, comprising to:
            weigh a first value associated with a first attribute of the content by a first weight to obtain a first weighted score;
            weigh a second value associated with a second attribute of the content by a second weight to obtain a second weighted score, the first weight being different from the second weight; and
            calculate the query-dependent score based on the first weighted score and the second weighted score;
         determine a content-class score for content available on the web site in response to the query, comprising to:
            determine a first content-class performance score based on a first query-dependent score, the first query-dependent score being associated with a first content item;
            determine a second content-class performance score based on a second query-dependent score, the second query-dependent score being associated with a second content item; and
            determine the content-class score based on the first content-class performance score and the second content-class performance score; and
         determine an overall score for content available on the web site based at least in part on the query-dependent score and based at least in part on the content-class score; and
      return a ranked list of content based at least in part on the query-dependent and content-class based ranking of content available on the web site in response to the query.

2. The system recited in claim 1, wherein the web site corresponds to a merchant web site, and wherein the web services data comprises content for the merchant web site.

3. The system recited in claim 1, wherein the web site corresponds to a merchant web site, wherein the web services data comprises content for the merchant web site, and wherein the content comprises a plurality of products available for sale on the merchant web site.

4. The system recited in claim 1, wherein the web site corresponds to a merchant web site, wherein the web services data comprises content for the merchant web site, and wherein the web services data further comprises a merchant data feed.

5. The system recited in claim 1, wherein the web site corresponds to a merchant web site, wherein the web services data comprises content for the merchant web site, wherein the web services data further comprises a merchant data feed, and wherein a product catalog for the merchant web site is provided to the query-dependent and content-class based ranking system using the merchant data feed.

6. The system recited in claim 1, wherein the web site corresponds to a merchant web site, wherein the web services data comprises content for the merchant web site, and wherein the web services data further comprises a merchant data feed and behavioral data associated with user activity on the merchant web site.

7. The system recited in claim 1, wherein the web site corresponds to a merchant web site, wherein the web services data comprises content for the merchant web site, and wherein the web services data further comprises a merchant data feed, web page content associated with the merchant web site, and behavioral data associated with user activity on the merchant web site.

8. The system recited in claim 1, wherein the web services data further comprises content for a plurality of web sites.

9. The system recited in claim 1, wherein the web services data further comprises content for a plurality of merchant web sites.

10. The system recited in claim 1, wherein the query-dependent and content-class based ranking system is in network communication with the web site.

11. The system recited in claim 1, wherein the query-dependent and content-class based ranking system is in network communication with the web site and a user browser that is in network communication with the web site.

12. A method of query-dependent and content-class based ranking, comprising:
- receiving a query for a search for content on a web site;
- performing a query-dependent and content-class based ranking of content available on the web site using a processor, comprising:
  - determining a query-dependent score for content available on the web site based at least in part on the query, comprising:
    - weighing a first value associated with a first attribute of the content by a first weight to obtain a first weighted score;
    - weighing a second value associated with a second attribute of the content by a second weight to obtain a second weighted score, the first weight being different from the second weight; and
    - calculating the query-dependent score based on the first weighted score and the second weighted score;
  - determining a content-class score for content available on the web site in response to the query, comprising:
    - determining a first content-class performance score based on a first query-dependent score, the first query-dependent score being associated with a first content item;
    - determining a second content-class performance score based on a second query-dependent score, the second query-dependent score being associated with a second content item; and
    - determining the content-class score based on the first content-class performance score and the second content-class performance score; and
  - determining an overall score for content available on the web site based at least in part on the query-dependent score and based at least in part on the content-class score; and
- returning a ranked list of content based at least in part on the query-dependent and content-class based ranking of content available on the web site in response to the query.

13. The method of claim 12, further comprising:
- storing web services data associated with the web site, wherein the web services data comprises content on the web site.

14. A computer program product for providing query-dependent and content-class based ranking, the computer program product being embodied in a tangible computer readable storage medium and comprising computer instructions for:
- receiving a query for a search for content on a web site;
- performing a query-dependent and content-class based ranking of content available on the web site, comprising:
  - determining a query-dependent score for content available on the web site based at least in part on the query, comprising:
    - weighing a first value associated with a first attribute of the content by a first weight to obtain a first weighted score;
    - weighing a second value associated with a second attribute of the content by a second weight to obtain a second weighted score, the first weight being different from the second weight; and
    - calculating the query-dependent score based on the first weighted score and the second weighted score;
  - determining a content-class score for content available on the web site in response to the query, comprising:
    - determining a first content-class performance score based on a first query-dependent score, the first query-dependent score being associated with a first content item;
    - determining a second content-class performance score based on a second query-dependent score, the second query-dependent score being associated with a second content item; and
    - determining the content-class score based on the first content-class performance score and the second content-class performance score; and
  - determining an overall score for content available on the web site based at least in part on the query-dependent score and based at least in part on the content-class score; and
- returning a ranked list of content based at least in part on the query-dependent and content-class based ranking of content available on the web site in response to the query.

15. The computer program product recited in claim 14, further comprising:
- storing web services data associated with the web site, wherein the web services data comprises content on the web site.

* * * * *